United States Patent [19]
Park et al.

[11] Patent Number: 5,589,079
[45] Date of Patent: Dec. 31, 1996

[54] CRYSTAL RECOVERY METHOD EMPLOYING A ROTARY VACUUM FILTRATION DRUM WITH VALVED HOPPER CAKE TREATMENT MEANS

[75] Inventors: David B. Park, Middleboro, Mass.; Michael F. Crawley, Maryville, Tenn.

[73] Assignee: Baker Hughes Incorporated, Salt Lake City, Utah

[21] Appl. No.: 442,958

[22] Filed: May 17, 1995

Related U.S. Application Data

[62] Division of Ser. No. 197,965, Feb. 17, 1994, Pat. No. 5,470,473.

[51] Int. Cl.$^6$ ................................................ B01D 33/06
[52] U.S. Cl. .................... 210/784; 210/791; 210/391; 210/402; 210/406
[58] Field of Search .................... 210/768, 784, 210/791, 391, 402, 406, 407, 408, 411, 418, 472, 739, 741; 209/910; 251/144, 172, 298; 414/219–221, 287

[56] References Cited

U.S. PATENT DOCUMENTS

| | | |
|---|---|---|
| 1,774,044 | 8/1930 | Sweetland . |
| 2,352,303 | 6/1944 | Young . |
| 2,655,265 | 10/1953 | Little . |
| 2,899,068 | 8/1959 | King et al. . |
| 4,137,935 | 2/1979 | Snowdon ............................ 251/172 |
| 4,465,497 | 8/1984 | Howeth ............................ 137/624.14 |
| 4,514,129 | 4/1985 | Legille et al. ............................ 414/221 |
| 4,728,250 | 3/1988 | Wilhelm et al. ............................ 414/221 |
| 5,093,001 | 3/1992 | Ueda ............................ 210/403 |
| 5,470,473 | 11/1995 | Park et al. ............................ 210/402 |

FOREIGN PATENT DOCUMENTS 9324440  12/1993  WIPO .

OTHER PUBLICATIONS

The American Heritage Dictionary 2nd College edition, ©1982 p. 622; Definition of "Hopper".

*Primary Examiner*—Robert J. Popovics
*Attorney, Agent, or Firm*—McAulay Fisher Nissen Goldberg & Kiel, LLP

[57] ABSTRACT

An assembly for recovering crystals from a slurry comprises a filtration unit including a rotatably mounted cylindrical filter, a slurry input for receiving slurry pressurized by a pump. The filtration unit has an outlet for discharging crystalline material separated from the slurry by the filtration unit. A first hopper connected to the filtration unit at the discharge outlet thereof is provided at a downstream side with a first valve unit which is in turn connected to a second hopper on a downstream side. A second valve unit is coupled to the second hopper at a downstream side thereof. Each of the valve units includes a rotatably mounted dome shaped valve member. The second hopper is provided with a vent extending to a gas storage tank. A conduit links the hoppers to one another for substantially equalizing pressure in the hoppers prior to an opening of the upstream valve during a discharge procedure. At least one of the hoppers is provided with a blower mechanism for removing crystalline material caked on a wall of the one of the first hopper and the second hopper.

5 Claims, 2 Drawing Sheets

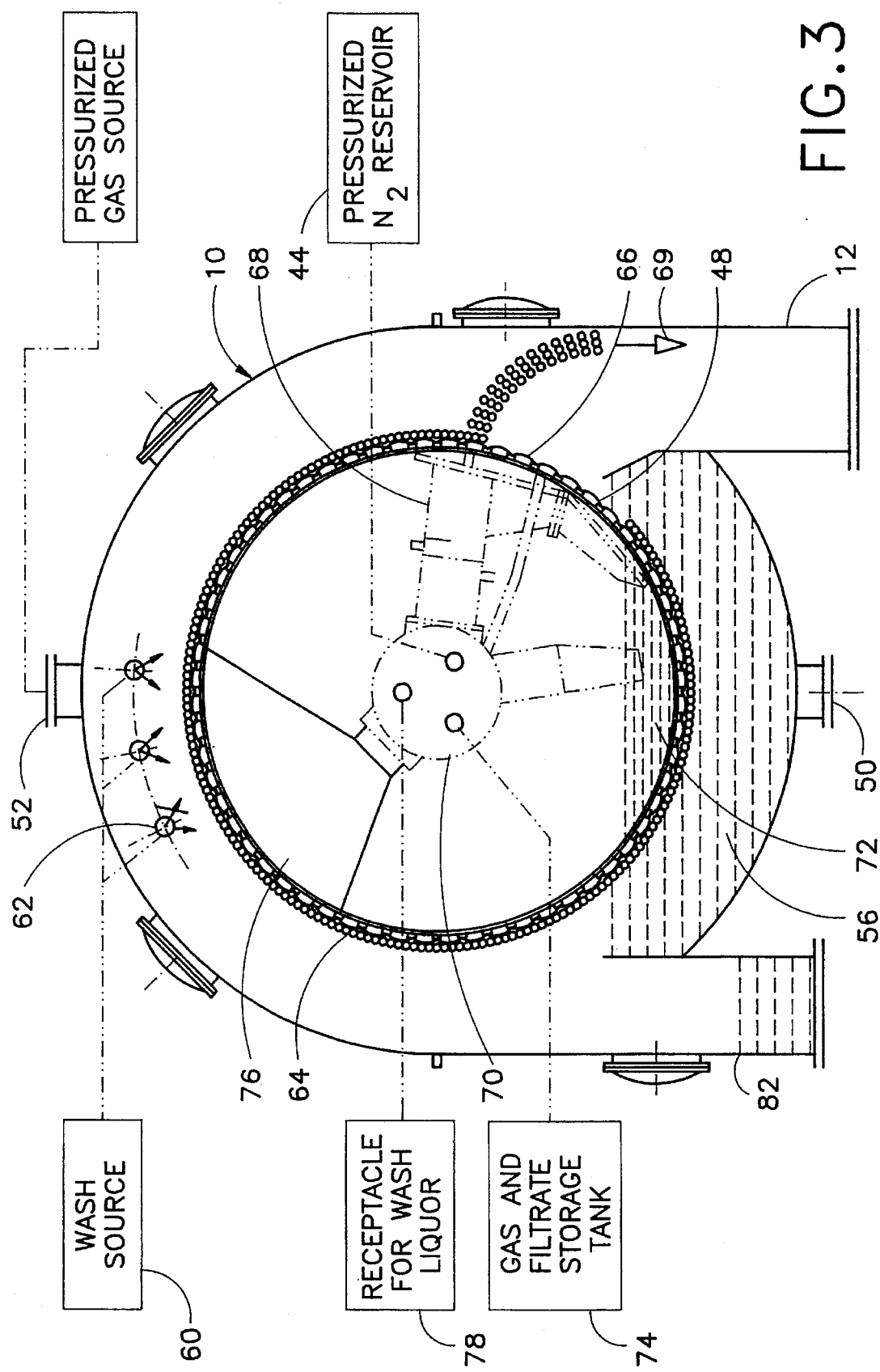

CRYSTAL RECOVERY METHOD EMPLOYING A ROTARY VACUUM FILTRATION DRUM WITH VALVED HOPPER CAKE TREATMENT MEANS

This application is a division of application No. 08/197,965 filed Feb. 17, 1994, now U.S. Pat. No. 5,470,473.

BACKGROUND OF INVENTION

This invention relates to an assembly and an associated method for recovering crystalline material from a slurry.

In the production of terephthalic acid, crystals of terephthalic acid are conventionally removed from a slurry via a rotary vacuum filtration unit. The filtration unit includes a cylindrical filter drum rotatably disposed inside a housing. The slurry is fed to the housing to a point radially outward of the filter. Suction applied inside the filter drum draws the liquid components of the slurry through the filter, with the terephthalic acid being deposited in a layer called a "cake" on the outer cylindrical surface of the drum.

As the filter drum rotates, the deposited crystalline layer is transported past a washing station where a washing fluid or liquor is dispensed onto the layer and drawn through the filter into the rotating drum. Subsequently, the purified terephthalic acid rotates to a discharge station where a jet of pressurized gas from inside the rotating cylinder pushes the deposited cake from the outer surface of the filter and into a discharge outlet.

In certain stages of a terephthalic acid production process, this rotary vacuum filtration technique can have the disadvantage of clogging the filter medium, thereby requiring extended downtime for the filter media replacement or repair. One attempt to obviate this disadvantage of the rotary vacuum filtration technique is to convert the filter to a high pressure and temperature installation, thereby increasing the saturation level of the filtrate and increasing average filter operation times. In accordance with this solution, as described in U.S. Pat. No. 5,093,001 to Ueda, the slurry at the input of the filtration unit is subjected to elevated pressure, thereby forcing fluid through the filter cloth and into the filter drum.

This pressurized rotary filtration technique results in higher pressures throughout the system, including the "cake" discharge orifice. However, a problem arises in containing the pressure within the system while allowing continuous throughput and discharge of the cake to lower or atmospheric conditions for downstream processing.

U.S. Pat. No. 5,093,001 discloses the disposition of a pair of valves at the output of a pressurized rotary filtration unit. However, this configuration is not sufficient to solve the pressure control problem and assist in maintaining a high continuous throughput of the rotary filtration unit.

SUMMARY OF THE INVENTION

An assembly for recovering crystals from a slurry comprises, in accordance with the present invention, a filtration unit including a rotatably mounted cylindrical filter, a slurry input and means for pressurizing slurry fed to the filtration unit via the input. The filtration unit has an outlet for discharging crystalline material separated from the slurry by the filtration unit. A first hopper connected to the filtration unit at the discharge outlet thereof is provided at a downstream side with a first valve unit which is in turn connected to a second hopper on a downstream side. A second valve unit is coupled to the second hopper at a downstream side thereof. Each of the valve units includes a rotatably mounted dome shaped valve member.

Generally, the filtration unit also includes washing componentry for dispensing a washing fluid or liquor onto a layer of crystalline material upon deposition thereof along an outer surface of the rotating filter during a filtration process. The washing fluid is ejected under pressure through the crystalline layer or cake and into the filter. Subsequently, the purified crystalline material rotates to a discharge station where a jet of pressurized gas from inside the rotating cylindrical filter pushes the deposited cake from the outer surface of the filter and into the discharge outlet.

Basic components of the filtration unit are described in U.S. Pat. No. 2,352,303. The dome shaped valves may each take the form of the valve described in U.S. Pat. No. 4,137,935 to Snowdon.

According to another feature of the present invention, the second hopper is provided with a vent. The vent may extend to a gas storage tank for facilitating further processing and cleaning of the gas discharged from the filtration system (including the filtration unit and other sources) via the ganged hoppers and the first valve unit. A conduit may link the hoppers to one another for substantially equalizing pressure in the hoppers prior to an opening of the upstream valve during a discharge procedure in accordance with the present invention.

According to a further feature of the present invention, at least one of the hoppers is provided with a mechanism for removing crystalline material caked on a wall of the one of the first hopper and the second hopper. This mechanism may include a gas dicharge device for blowing gas against the crystalline material caked on the wall.

The hoppers preferably include a funnel tapered towards the respective following valve unit.

A method for use in recovering crystals from a slurry comprises, in accordance with the present inventions the steps of (a) providing a filtration unit including a rotatably mounted cylindrical filter, (b) pressurizing the filtration unit (up to bars), (c) feeding a slurry under pressure to an input of the filtration unit, (d) rotating the filter during the steps of feeding and pressurizing, and (e) discharging, into a first hopper, crystalline material separated from the slurry by the filtration unit and caked on an outer surface of the filter. The first hopper has an outlet with a first valve unit in a closed state. Downstream of the first valve unit is a second hopper and a second valve unit, which is initially closed, at an outlet thereof. Further steps in the method include (f) substantially equalizing pressure in the first hopper and the second hopper, (g) then opening the first valve unit, (h) transferring crystalline material from the first hopper into the second hopper upon opening of the first valve unit, while maintaining the second valve unit closed, (i) closing the first valve unit upon transferring crystalline material from the first hopper into the second hopper, (j) venting pressure from the second hopper, and (k) opening the second valve to discharge the crystalline material from the second hopper to essentially atmospheric pressure upon depressurization of the second hopper.

Pursuant to another feature of the present invention, the method further comprises the step of removing crystalline material caked on a wall of a given one of the first hopper and the second hopper. Preferably, the removal is implemented by blowing gas against the crystalline material caked on the wall.

Where the valve units each includes a rotatably mounted dome shaped valve member, the steps of opening and closing the valve units include the step of rotating the respective dome shaped valve member. This rotation may be a partial rotation, in the manner of pivoting, or may be rotation in the same direction to open and close the valve.

The method outlined above is performed by an assembly comprising a pressurized rotary filtration unit, a first hopper connected to the filtration unit at an outlet thereof, a first valve unit connected to the hopper at a downstream side thereof, a second hopper connected to the first valve unit downstream thereof, a second valve unit connected to the second hopper at a downstream side thereof, means connected to the hoppers for substantially equalizing pressure therein prior to an opening of the first valve unit, and a vent connected to the second hopper for reducing pressure in the second hopper prior to opening of the second valve unit. The filtration unit includes a rotatably mounted cylindrical filter, a slurry input and means for pressurizing slurry fed to the filtration unit via the input.

A filtration assembly and associated method in accordance with the present invention increases the average continuous operating time of the filtration unit while serving to maintain the continuous throughput of the assembly.

According to another feature of the present invention, a method for recovering crystals from a slurry comprises the steps of (i) operating a filtration unit under pressure to remove a crystalline material from a slurry, (ii) discharging the crystalline material into a pressure equalization assembly, (iii) operating the pressure equalization assembly to reduce pressure of the crystalline material to at least approximately atmospheric pressure, (iv) guiding the crystalline material at an output of the pressure equalization assembly to a conveyor, and (v) continuously operating the conveyor to remove the crystalline material from the output of the pressure equalization assembly. Where the rate at which the slurry is fed to the filtration unit is modified, the rate of operation of the conveyor is adjusted to compensate for the modification of the rate of slurry feed. This adjustment may be implemented automatically, for example, in response to sensing a different feed rate or a concomitantly different output rate at the discharge end of the pressure equalization assembly (including the two hoppers and valve units). Alternatively, adjustment in the speed of the conveyor may be made in response to a different setting for the slurry feed. Thus, the slurry feed rate and the conveyor speed are adjusted in parallel in response to the same control change.

The conveyor may be a screw conveyor or other type of continuous conveyance system. In addition, it is to be noted that the adaptation of the output stream in accordance with the rate of infeed to the filtration unit may be accomplished by other techniques such as adjusting an opening at the discharge or output end of the pressure equalization assembly.

A pressure equalization discharge assembly in accordance with the present invention enables or facilitates a continous conveyance of the crystalline material at the output of the filtration unit. Continuous conveyance is especially advantageous, if not necessary, where the output material is being delivered to a continuously operating drying unit.

BREIF DESCRIPTION OF THE DRAWING

FIG. 3 is a schematic cross-sectional view showing functional components of a rotary filtration unit in the assembly of FIGS. 1 and 2.

DETAILED DESCRIPTION

Figure 1:
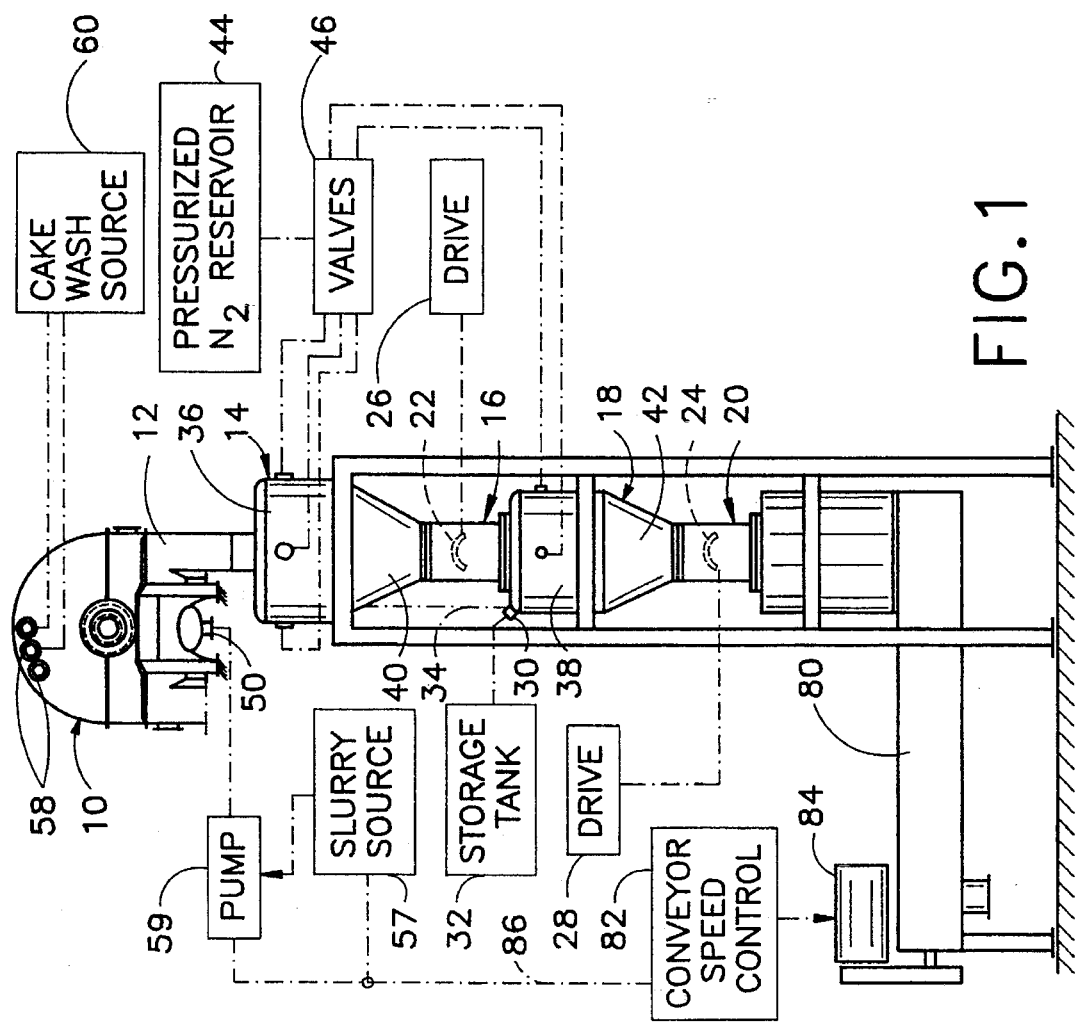
FIG. 1 is a front elevational view of a pressurized rotary filtration assembly in accordance with the present invention.
Figure 2:
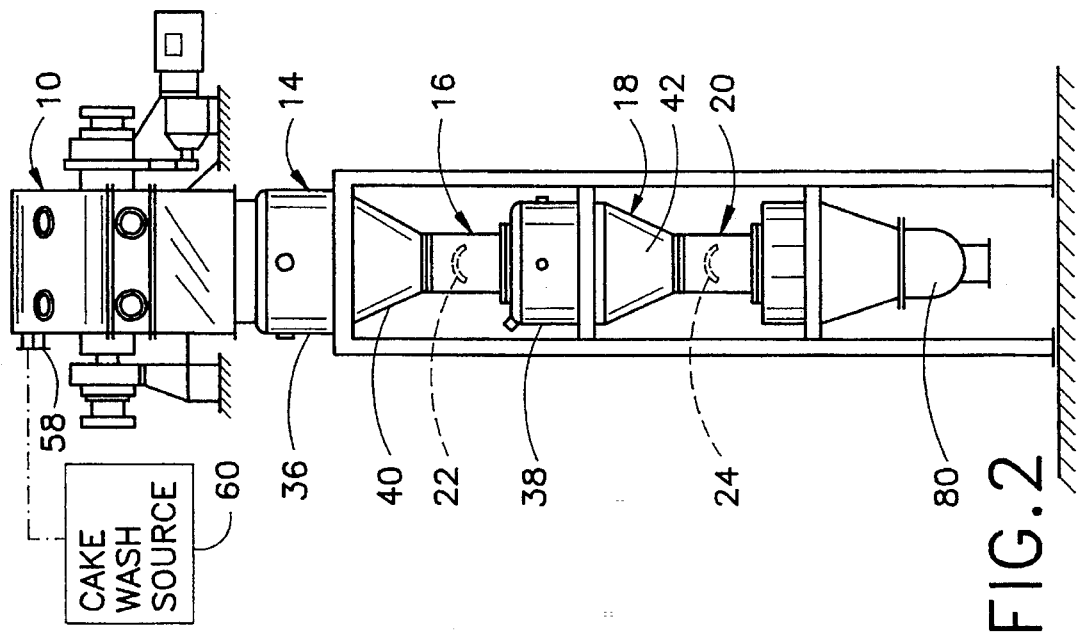
FIG. 2 is a side elevational view of the pressurized rotary filtration assembly of FIG. 1.

As illustrated in FIGS. 1 and 2, an assembly for recovering crystals from a slurry comprises a filtration unit 10 with an outlet 12 for discharging crystalline material separated from the slurry by filtration unit 10. A first hopper 14 is connected to filtration unit 10 at discharge outlet 12 thereof and is in turn coupled at a downstream side with a first valve unit 16. Valve unit 16 is connected on a downstream side to a second hopper 18 in turn provided at an outlet side with a second valve unit 20. Each of the valve units 16 and 20 includes a respective rotatably mounted dome shaped valve member 22 or 24.

It is contemplated that valve units 16 and 20 each take the form of the valve described in U.S. Pat. No. 4,137,935 to Snowdon, which is hereby incorporated by reference herein. Dome shaped valve members 22 and 24 are operatively coupled to respective drives 26 and 28 which are operated under the control of a programmer or microprocessor (not illustrated). Drives 26 and 28 may be linear drives coupled to dome shaped valve members 22 and 24 via respective torque arms (not shown) to provide 90° of angular rotation.

As further illustrated in FIGS. 1 and 2, downstream hopper 18 is provided with a vent 30 extending at an angle to a gas storage tank 32 which holds, for further processing and cleaning, gas discharged from the filtration system via hoppers 14 and 18 and valve unit 16. A conduit 34 (provided with a non-illustrated valve) links hoppers 14 and 18 to one another for substantially equalizing pressure in the hoppers (within 2 psi) prior to an opening of upstream valve 16 during a discharge procedure as described below. Alternatively, hopper 18 could be pressurized by gas from a separate source.

Hoppers 14 and 18 may be formed together as a single casting including an interposed valve housing and are provided with polished inner surfaces. Hoppers 14 and 18 each include a cylindrical upper portion 36 and 38 and a funnel shaped lower portion 40 and 42 which is tapered towards the respective following valve unit 16 or 20. Hoppers 14 and 18 are connected to a reservoir or source 44 of pressurized nitrogen gas via valves 46. Under the control of a programmer or microprocessor (not shown), valves 46 selectively open to eject a blast of pressurized nitrogen gas against caked crystalline materials deposited on the inner walls of hoppers 14 and 18. The nitrogen gas blast serves to remove the deposited crystalline material from the walls of the hoppers. Alternative methods for removing deposited crystal line material from the walls of the hoppers include rodding the interior or vibrating the hoppers. The former alternative method is not believed to be as reliable as gaseous removal, while the latter alternative is not suitable for heavy pressure vessels.

Filtration unit 10 takes a form generally known, for example, from U.S. Pat. No. 2,352,303 to Young, the disclosure of which is hereby incorporated by reference herein. As illustrated in FIG. 3, filtration unit 10 includes a rotatably mounted cylindrical filter drum 48, a slurry input 50 and an input 52 coupled to a pressurized gas source 54. Slurry 56 is fed to filtration unit 10 from a slurry source 57 via input 50. Slurry 56 is pressurized by the action of a pump or booster 59 (FIG. 1).

As shown in FIGS. 1 and 2, filtration unit 10 also includes ports 58 connected on an input side to a source 60 of washing liquor and on an output side, inside the filtration unit, to nozzles 62 (FIG. 3) for dispensing a washing fluid or liquor onto a layer 64 of crystalline material upon deposition thereof along an outer surface of rotating filter drum 48 during a continuous filtration process. The washing fluid is ejected under pressure through the crystalline layer or cake 64 and into filter drum 48. Subsequently, the purified crystalline material rotates to a discharge station 66 where a jet of pressurized gas from a blowing horn 68 inside filter drum 48 pushes the deposited cake 69 from the outer surface of drum 48 and into discharge outlet 12.

Filtration unit 10 further includes an exhaust component 70 for removing gas and filtrate 72 from inside filter drum 48 to a storage tank 74, and a collector 76 for channeling away spent wash liquor to a storage receptacle 78. Blowing horn 68 is linked to reservoir 44 of pressurized nitrogen gas. A slurry accumulator connector 82 is provided on filtration unit 10 for collecting slurry overflow for recycling to the filtration unit.

In recovering crystals 69 from slurry 56, the slurry is fed under pressure to input 50 of filtration unit 10, which itself has been pressurized by gas from source 54. Source 54 may be the same as reservoir 44.

Filter drum 48 is continuously rotated during the filtration process so that crystalline material is deposited in layer or cake 64 along the outer surface of drum 48. Subsequently, cake 64 is washed with fluid or liquor from source 60 and is rotated to discharge station 66, where gas blown from horn 68 through filter drum 48 dislodges cake 64 and ejects or discharges fragmented crystalline material 69 into hopper 14 via outlet 12. During a first stage of an operating cycle of valve units 16 and 20, both valves units are closed. Upon a completed filling of upstream hopper 14, the internal pressures of hoppers 14 and 18 are substantially equalized (within 2 psi) via conduit 34. Upon pressure equalization, upstream dome shaped valve member 22 is rotated or pivoted by drive 26 to enable transfer of material from hopper 14 to hopper 18. Subsequently, drive 26 is reversed to rotate valve member 22 back to a valve closed position. Then, gas is transferred from hopper 18 to tank 32 via vent 30, to reduce the pressure in downstream hopper 18 to approximately atmospheric pressure. Upon that reduction, drive 28 rotates or pivots dome shaped valve member 24 to enable the discharge of crystalline material from downstream hopper 18. During that discharge, upper hopper 14 is being refilled with crystalline discharge from filtration unit 10. After an effective emptying of hopper 18, drive 28 closes valve member 24, whereupon hopper 18 is ready for pressure equalization and a new cycle of operation.

Valves 46 are periodically opened to enable the removal of crystalline terephthalic acid (or other target material) which has adhered to the internal side walls of hoppers 14 and 18.

Upon the opening of valve 20, purified terephthalic acid falls to a screw conveyor 80 or other mechanism adapted for continous transport. Conveyor 80 delivers a continuous stream of purified terephthalic acid to a drying unit or oven (not shown).

The rate of operation of screw conveyor 80 can be adjusted during use to accord with a change in slurry feed rate and a concomitant alteration in the output rate of the purified terephthalic acid. To that end, an speed control unit 82 may be operatively connected at an output to a motor 84 which drives conveyor 80. The speed control unit 82 may be operatively coupled on an input side via a connection 86 to slurry source 57 or slurry pump 59, whereby the rotation speed of a screw (not shown) of conveyor 80 is adjusted automatically in response to a change in the slurry feed rate. Matching of the conveyor speed to the feed rate through filtration unit 10 may be implemented automatically by other equivalent techniques, for example, by monitoring output rate at the discharge end of the pressure equalization assembly (including hoppers 14 and 18 and valve units 16 and 20). Alternatively, adjustment in the speed of rotation of a screw mechanism in the conveyor may be made in response to a different setting for the slurry feed. Thus, the slurry feed rate and the conveyor speed are adjusted in parallel in response to the same control change.

Owing to the high pressures to which filtration unit 10 is subjected, that unit is advantageously either cylindrical or spherical. It is to be further noted that filter drum 48 is a perforated steel drum provided along an outer surface with a filter layer of cloth fiber or stainless steel. The filter material must be capable of withstanding pressures up to 10 bars and temperatures up to 350° F.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for recovering crystals from a slurry, comprising:

providing a filtration unit including a rotatably mounted cylindrical filter;

pressurizing said filtration unit;

feeding a slurry under pressure to an input of said filtration unit;

rotating said filter during the pressurizing of said filtration unit and the feeding of said slurry;

discharging, into a first hopper, crystalline material separated from said slurry by the filtration unit and caked on an outer surface of said filter, said first hopper having an outlet with a first valve unit in a closed state second hopper having an outlet with a second valve unit in a closed state;

opening said first valve unit;

upon opening of said first valve unit, transferring crystalline material from said first hopper into said second hopper, while maintaining said second valve unit closed;

upon transferring crystalline material from said first hopper into said second hopper, closing said first valve unit;

upon transfer of crystalline material from said first hopper into said second hopper, opening said second valve unit to discharge the crystalline material from said second hopper to essentially atmospheric pressure; and removing crystalline material caked on a wall of a given one of said first hopper and said second hopper.

2. The method defined in claim 1 wherein the removing of crystalline material from said wall includes the step of blowing gas against the crystalline material caked on said wall.

3. The method defined in claim 1, wherein said crystalline material is discharged from said second hopper to a conveyor, further comprising continuously operating said conveyor to remove said crystalline material from said output of said pressure equalization assembly in a continuous stream.

4. The method defined in claim 3, further comprising:

modifying a rate of feeding said slurry to said filtration unit; and adjusting a rate of operation of said conveyor in accordance with the modification of the rate of feeding said slurry.

5. The method defined in claim 1 wherein said first valve unit and said second valve unit each includes a rotatably mounted dome shaped valve member, the closing of said first valve unit and the opening of said second valve unit each comprising rotating the respective rotatably mounted dome shaped valve member.

* * * * *